United States Patent [19]
Zonis

[11] Patent Number: 5,039,920
[45] Date of Patent: Aug. 13, 1991

[54] METHOD OF OPERATING GAS-FILLED TUBES

[75] Inventor: Jerome Zonis, 9240 19th St., Alta Loma, Calif. 91701

[73] Assignee: Royce Electronic Products, Inc., Rancho Cucamonga, Calif.

[21] Appl. No.: 164,239

[22] Filed: Mar. 4, 1988

[51] Int. Cl.5 .................. G05F 1/00; H05B 37/02; H05B 39/04; H05B 41/36
[52] U.S. Cl. ............................................. 315/291
[58] Field of Search ............... 315/DIG. 5, DIG. 7, 315/244, 169.4, 172, 174, 171, 175, 219, 224, 291, 220, 221, 222, 223, DIG. 4

[56] References Cited

U.S. PATENT DOCUMENTS

| | | | |
|---|---|---|---|
| 2,016,790 | 10/1935 | Perlman | 175/356 |
| 2,309,711 | 2/1943 | Pearson | 176/124 |
| 2,443,235 | 6/1948 | Foster | 315/127 |
| 2,497,534 | 2/1950 | Campbell | 315/233 |
| 2,507,101 | 5/1950 | Hall | 315/257 |
| 2,511,939 | 6/1950 | Packard | 315/219 |
| 2,515,676 | 7/1950 | Turner | 315/243 |
| 2,764,696 | 9/1956 | Hepp | 250/83.6 |
| 2,780,766 | 2/1957 | Hedding et al. | |
| 2,804,547 | 8/1957 | Mortimer | 250/36 |
| 2,832,009 | 4/1958 | Blet | 315/183 |
| 2,846,581 | 8/1958 | Volkers | 250/36 |
| 2,849,615 | 8/1958 | Gustafson | 250/36 |
| 2,852,730 | 9/1958 | Magnuski | 321/2 |
| 2,883,539 | 4/1959 | Bruck et al. | 250/36 |
| 2,895,081 | 7/1959 | Crownover et al. | 315/206 |
| 2,903,636 | 9/1959 | Guyton | 321/2 |
| 2,915,710 | 12/1959 | Schiewe et al. | |
| 2,916,704 | 12/1959 | Morey | 331/113 |
| 2,923,856 | 2/1960 | Greene et al. | 315/138 |
| 2,928,994 | 3/1960 | Widakowich | 315/205 |
| 2,930,989 | 3/1960 | Krieger | 331/112 |
| 2,964,676 | 12/1960 | Davies et al. | 315/98 |
| 2,971,126 | 2/1961 | Schultz | 315/205 |
| 2,983,846 | 5/1961 | Roesel, Jr. et al. | 315/97 |
| 3,005,130 | 10/1961 | Schwartz | 315/206 |
| 3,008,068 | 11/1961 | Wilting et al. | 315/206 |
| 3,013,219 | 12/1961 | Fischman | 331/112 |
| 3,018,408 | 1/1962 | Genuit | 315/95 |
| 3,031,598 | 4/1962 | Bell | 315/201 |
| 3,034,015 | 5/1962 | Schultz | 315/97 |
| 3,034,073 | 5/1962 | Newell et al. | 331/114 |
| 3,037,147 | 5/1962 | Genuit et al. | 315/205 |
| 3,084,283 | 4/1963 | Grunwaldt | 315/205 |
| 3,096,464 | 7/1963 | Lemmers | 315/105 |
| 3,119,048 | 1/1964 | Tsuchiya | 315/200 |
| 3,141,140 | 7/1964 | Rich | 331/71 |
| 3,146,406 | 8/1964 | Wilting | 331/113 |
| 3,155,875 | 11/1964 | Wenrich et al. | 315/189 |
| 3,170,084 | 2/1965 | Retzer | 315/173 |
| 3,174,042 | 3/1965 | White | 250/83.6 |
| 3,233,148 | 1/1966 | Lake | 315/200 |
| 3,242,415 | 3/1966 | King et al. | 321/45 |
| 3,247,422 | 4/1966 | Schultz | 315/206 |
| 3,248,640 | 4/1966 | Wellford | 321/45 |
| 3,256,495 | 6/1966 | Hunter | 331/113 |
| 3,263,125 | 7/1966 | Genuit | 315/219 |
| 3,267,349 | 8/1966 | Krause | 321/2 |
| 3,283,144 | 11/1966 | Rogers | 240/51.11 |
| 3,295,042 | 12/1966 | Evalds et al. | 321/2 |
| 3,307,073 | 2/1967 | McLaughlin | 315/219 |
| 3,341,737 | 9/1967 | Rosa | 315/194 |
| 3,350,661 | 10/1967 | Bloom et al. | 331/113 |
| 3,351,807 | 11/1967 | Chermin | 315/99 |
| 3,351,839 | 11/1967 | Johnson et al. | 321/45 |

(List continued on next page.)

*Primary Examiner*—Theodore M. Blum
*Attorney, Agent, or Firm*—Lyon & Lyon

[57] ABSTRACT

A gas-filled tube is operated by application of a powered electrical signal which stimulates the tube at or near its maximum efficiency region for lumens/watt output; the signal may generally stimulate the tube at a frequency between about 20 KHz and about 100 KHz with an on-to-off duty cycle of greater than one-to-one. Without limiting the generality of the invention, formation of the disclosed powered electrical signal is performed using an electrical circuit comprising a feedback transformer having primary and secondary coils, a feedback coil, and a bias coil, operatively connected to a feedback transistor and to a plurality of gas-filled tubes connected in parallel.

4 Claims, 2 Drawing Sheets

U.S. PATENT DOCUMENTS

| | | | |
|---|---|---|---|
| 3,371,244 | 2/1968 | Bolund | 315/219 |
| 3,371,245 | 2/1968 | Hume | 315/240 |
| 3,389,298 | 6/1968 | Skirvin | 315/206 |
| 3,389,299 | 6/1968 | Bell | 315/206 |
| 3,396,307 | 8/1968 | Campbell | 315/221 |
| 3,398,371 | 8/1968 | Lamb | 328/9 |
| 3,432,723 | 3/1969 | Miller et al. | 315/94 |
| 3,448,370 | 6/1969 | Harrigan | 321/45 |
| 3,467,887 | 9/1969 | Skirvin | 315/209 |
| 3,471,747 | 10/1969 | Gershen | 315/205 |
| 3,501,674 | 3/1970 | Moore | 315/105 |
| 3,506,908 | 4/1970 | Resch | 321/45 |
| 3,573,544 | 4/1971 | Zonis et al. | 315/206 |
| 3,579,026 | 5/1971 | Paget | 315/99 |
| 3,582,754 | 6/1971 | Hoffman et al. | 321/2 |
| 3,584,289 | 6/1971 | Bishop et al. | 321/18 |
| 3,588,595 | 6/1971 | Silvers | 315/127 |
| 3,593,109 | 7/1971 | Wellford | 321/45 R |
| 3,604,920 | 9/1971 | Niles | 240/11.4 R |
| 3,619,713 | 11/1971 | Biega | 315/105 |
| 3,621,450 | 9/1972 | Cox | 321/45 R |
| 3,629,648 | 12/1971 | Brown et al. | 315/98 |
| 3,629,725 | 12/1971 | Chun et al. | 331/113 A |
| 3,638,099 | 1/1972 | Centela | 321/45 R |
| 3,663,941 | 5/1972 | Pasciutti | 321/2 |
| 3,684,891 | 8/1972 | Sieron | 307/66 |
| 3,737,756 | 6/1973 | Hasley et al. | |
| 3,753,071 | 8/1973 | Engel et al. | 321/2 |
| 3,753,076 | 8/1973 | Zelina | 321/45 R |
| 3,769,545 | 10/1973 | Crane | 315/219 |
| 3,818,312 | 6/1974 | Luursema et al. | 321/44 |
| 3,851,278 | 11/1974 | Isono | 331/113 A |
| 3,882,354 | 5/1975 | May | 315/101 |
| 3,903,452 | 9/1975 | Nakai et al. | 315/201 |
| 3,912,969 | 10/1975 | Nakai et al. | 315/278 |
| 3,913,036 | 10/1975 | Hook | 331/113 A |
| 3,916,289 | 10/1975 | Lynch | 321/45 R |
| 3,927,363 | 12/1975 | Mitchell et al. | 321/11 |
| 3,949,268 | 4/1976 | von Mangoldt | 315/239 |
| 4,005,335 | 1/1977 | Perper | 315/224 |
| 4,017,783 | 4/1977 | Holger, et al. | |
| 4,150,323 | 4/1979 | Yeh et al. | 315/209 R |
| 4,210,846 | 7/1980 | Capewell et al. | 315/DIG. 5 |
| 4,277,726 | 7/1981 | Burke | 315/98 |
| 4,350,935 | 9/1982 | Spira et al. | 315/DIG. 4 |
| 4,667,132 | 5/1987 | Leale | 315/DIG. 7 |
| 4,686,427 | 8/1987 | Burke | 315/DIG. 7 |
| 4,712,170 | 12/1987 | Grace | 315/DIG. 7 |

5,039,920

METHOD OF OPERATING GAS-FILLED TUBES

BACKGROUND OF THE INVENTION

1. Field of the Invention

This invention relates to the field of methods for operating gas-filled tubes, e.g. fluorescent lighting tubes.

2. Description of Related Art

Gas-filled tubes, including fluorescent lighting tubes, are well known devices for producing light from electrical energy. These tubes generally operate by providing an ionized path in a gaseous medium which may conduct electricity between a pair of electrodes fastened on opposite sides of the tube. Because of the electrical properties of tubes, it is not generally possible to operatively connect a tube directly to the building power supply. It has become common in the art to supply an operating circuit for one or more tubes, commonly called a "ballast." Commercially available ballasts may vary significantly in power consumption, efficiency, and tube capacity.

Accordingly, there is a need for a method of operating gas-filled tubes which draws little power and efficiently operates gas-filled tubes using that power, prolongs tube operating life, resists catastrophic consequences of tube burnout and other electrical problems, at reasonable cost.

SUMMARY OF THE INVENTION

A gas-filled tube is operated by application of a powered electrical signal which stimulates the tube at or near its maximum efficiency region for lumens/watt output; this signal may generally stimulate the tube at a frequency between about 20 KHz and about 100 KHz. The signal has a periodic AC waveform with a noncontinuous sinusoidal shape and with an on-to-off duty cycle of greater than 1-to-1, e.g. between about 1.5-to-1 and about 3-to-1. This waveform is derived from a pulsed periodic signal generated by the circuit having an on-to-off duty cycle of less than 1-to-1.

Without limiting the generality of the invention, formation of the disclosed powered electrical signal is performed using an electrical circuit comprising a feedback transformer having primary and secondary coils, a feedback coil, and a bias coil, operatively connected to a feedback transistor and to a plurality of gas-filled tubes connected in parallel-series or series-parallel. The feedback transformer may operate in conjunction with a coupling capacitor to perform feedback control and to operate one or more tubes near or at a series resonance frequency.

DESCRIPTION OF THE PREFERRED EMBODIMENT

Figures 1, 2:
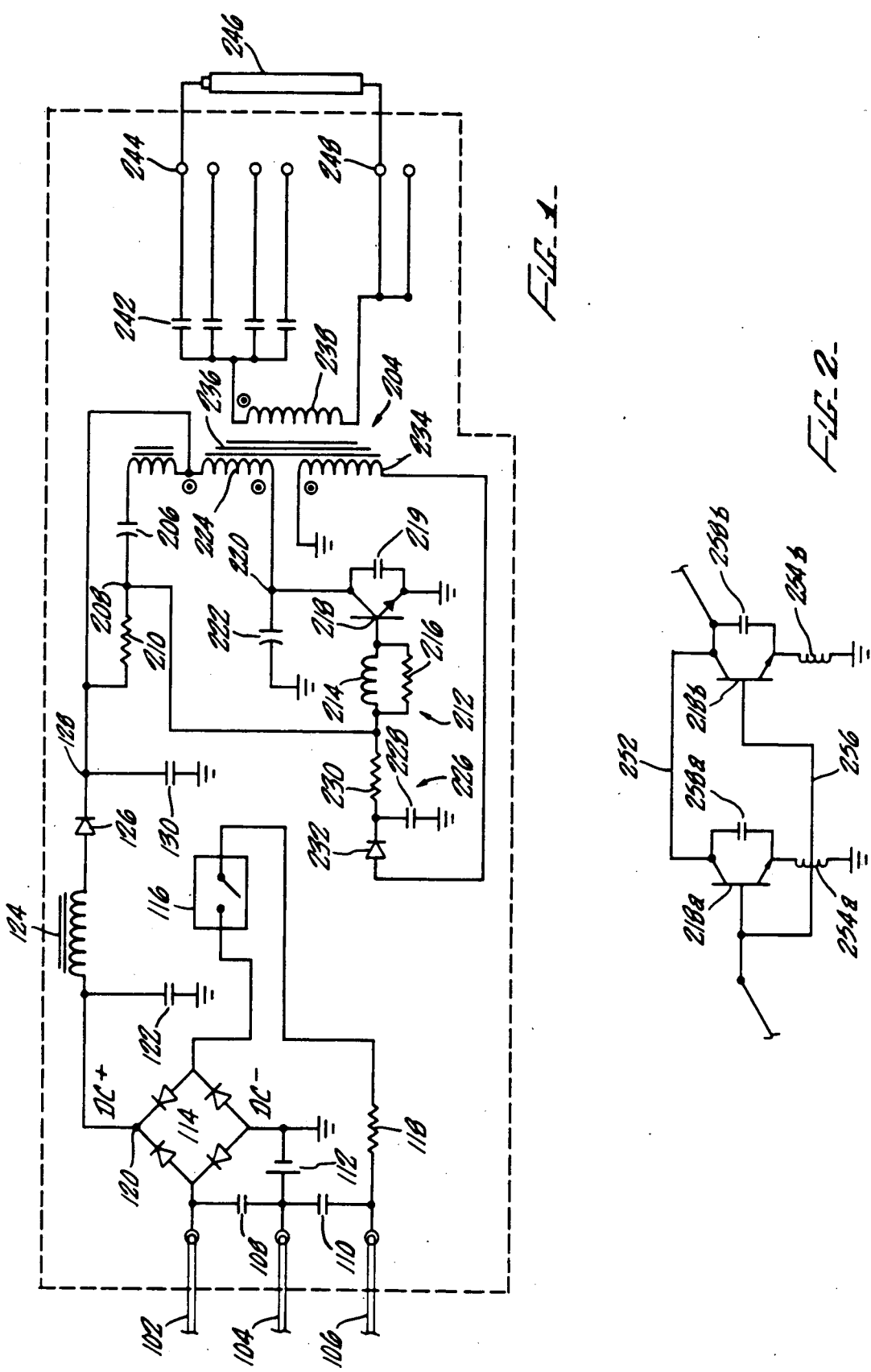
FIG. 1 is a drawing of a circuit for operating gas-filled tubes.
FIG. 2 is a drawing of a circuit employing multiple transistors arranged in parallel.

FIG. 1 is a drawing of a circuit for operating gas-filled tubes. Alternating current ("AC"), preferably one leg of a 480 volt, three phase AC power supply, is input at nodes 102, 104 and 106. Node 104 is electrically connected to ground. Nodes 102 and 104 are electrically connected via capacitor ("C") 108; nodes 104 and 106 are electrically connected via C 110; and node 104 is further electrically connected to ground via C 112.

Node 102 is electrically connected to an AC input of diode bridge 114 (comprising four diodes ["D"]); a second AC input of bridge 114 is electrically connected to node 106 via thermal switch 116 and resistor ("R") 118. The negative DC output of bridge 114 is electrically connected to ground. Node 120 (the positive DC output of bridge 114) is electrically connected to ground via C 122; node 120 is also electrically connected in series inductor ("L") 124 and D 126 to node 128, which is electrically connected to ground via C 130. Node 128 supplies power for the remainder of the circuit.

It will become clear to one of ordinary skill in the art, after an examination of the specification, drawings, and claims herein, that thermal switch 116 and R 118 each perform a safety function of limiting the current which is supplied to the circuit. Thermal switch 116 opens whenever it is heated beyond a critical temperature, as is well known in the art and as is generally required by Underwriters' Laboratories for their "UL" certification. R 118 is a low power resistor (e.g. R 118 may be a 0.5 watt resistor, or may be a larger resistor able to withstand the amount of current which it is desired that the circuit be able to receive) and will also open, due to failure, when its critical power limit is exceeded. Either thermal switch 116 or R 118 will suffice to prevent excessive power flows to the circuit.

It will also become clear to one of ordinary skill in the art, after an examination of the specification, drawings, and claims herein, that circuitry shown in FIG. 1 to the right of node 128 has generally capacitive load, while circuitry shown in FIG. 1 to the left of node 128 has generally inductive load. This match of inductive load to capacitive load allows the circuit to perform efficiently and to be free from power losses to which prior art circuits are generally subject.

In an alternate embodiment, an additional capacitor (not shown) may be electrically connected between node 106 and R 118, thus reducing the capacitance of the entire circuit. In a preferred version of this alternate embodiment, more than one such additional capacitor (not shown) may be electrically connected in conjunction with a stepping switch. It will be clear to those of ordinary skill in the art that the addition of such capacitance results in decreased voltage supplied to the remainder of the circuit, thus the use of multiple capacitors in conjunction with a stepping switch performs the function of a step dimmer.

Node 128 is electrically connected to winding ("W") 202, which proceeds from its start point at its electrical connection with node 128 at a middle point of transformer ("T") 204, to its end point at the end of the core for T 204. The direction of W 202 is given because, although the operation of an AC transformer is generally indifferent to the direction of its windings, the direction of W 202 and other windings disclosed herein are found to be relevant to the operation of a preferred embodiment of the invention. The end point of W 202 is electrically connected via C 206 to node 208, which is electrically connected via R 210 back to node 128 to form a feedback loop. W 202 is thus called the "feedback winding".

In a preferred embodiment, R 210 is a small resistor, of just sufficient resistance to build up a small voltage when power is applied to the circuit. The small voltage which R 210 develops is just sufficient to cause that part of the circuit comprising T 204 and Q 218 (disclosed hereinbelow) to begin oscillation, after which the operation of feedback winding W 202 & bias winding W 234 combine to dominate such oscillation behavior, in a reverse biasing mode.

Node 208 is electrically connected via a parallel combination 212 (comprised of L 214 and R 216 arranged in parallel to the base of transistor ("Q") 218. Q 218 has its emitter electrically connected to ground and its collector electrically connected to node 220, which is itself electrically connected to ground via C 222. Q 218 has its collector and its emitter electrically connected via C 219. Node 220 is electrically connected to W 224, which proceeds from its start point at its electrical connection to node 220 at a middle point of T 204 to its end point at node 128 (node 128 is also the start point for W 202). The electrical connection from node 128 via R 210, parallel combination 212, Q 218, and W 224 back to node 128 forms the primary power transmission mechanism of the circuit. W 224 is thus called the "primary winding".

It should be clear to those of ordinary skill in the art that, with the present circuit arrangement, Q 218 operates at substantially better than rated specifications, transmitting more power with reduced temperature. The presence of L 214 adds inductance to the base of Q 218, allowing Q 218 to transmit more power. This allows the circuit of the present invention to light tubes at startup at a lower voltage, or in the alternative, to start more tubes at the same voltage.

In an alternate embodiment, multiple transistors may be substituted for Q 218 in an effort to transmit more power. FIG. 2 shows a circuit in which two transistors Q 218a and 218b are arranged in parallel. The collectors of both transistors are electrically connected with a conductor 252. The emitters of both transistors are each electrically connected to ground via L 254a and 254b respectively. The bases of both transistors are electrically connected with a conductor 256. The collector and emitter of each transistor are electrically connected via C 258a and 258b respectively. When multiple transistors are substituted for Q 218, the common bases are electrically connected in the main circuit where the base of Q 218 would be connected (i.e. to filter 212), and the collectors of all transistors (e.g. Q 218b) are electrically connected in the main circuit where the collector of Q 218 would be connected (i.e. to node 220).

Node 218 is also electrically connected via filter 226 (comprised of C 228 and R 230 arranged in series, as is well known in the art) and via reversed D 232, to the end point of W 234, which proceeds from its start point at its electrical connection to ground at a middle point of T 204 to its end point at its electrical connection to D 232. W 234 serves to bias the voltage across T 204 and is thus called the "bias winding".

In a preferred embodiment, T 204 has a soft ferrite core 236 with an air gap substantially larger than standard, which is found to reduce its reluctance. As used herein, a "standard" air gap is between about 7 milliinches and about 15 miliinches, as is well known in the art. See e.g. *Siemens Reference Catalog for Pre-gapped Cores*. W 238 is the secondary winding for T 204, and proceeds from its start point at one end of the core 236 to its end point at the other end of the core 236. In FIG. 1, a dot indicates the start point of W 202, 220, 234 and 238. It is found that the polarity of W 238 with respect to W 202, 220 and 234 is relevant to the operation of a preferred embodiment of the invention.

The start point of W 238, node 240, is electrically connected in parallel via one or more C 242 to an equal number of tube cathodes 244 for gas-filled tubes 246. Although four tubes 246 are shown in FIG. 1, it would be clear to one of ordinary skill in the art that any other reasonable number of tubes 246 may be operated with the circuit disclosed herein, and such variations will become clear to one of ordinary skill in the art after examination of the specification, drawings and claims herein. For example, it is possible to electrically connect more than one tube 246 in series and to operate the tubes 246 with the circuit of the present invention in that manner. The other end of each tube 246 has a tube anode 248 which is electrically connected to the end point of W 238. In a preferred embodiment of the invention, each tube cathode 244 has both leads 244a-b and each tube anode 248 has both leads 248a-b (as supplied in commonly available gas-filled tubes) electrically connected together. It is found that the disclosed ratio of capacitance between C 206 and C 242 is relevant to proper operation of the circuit.

Theory of Operation

Now that the circuit of the invention has been disclosed, along with sufficient information for those skilled in the art to make and use the same, a theory of operation of the circuit of the invention is disclosed for the edification of those skilled in the art.

Figure 3:
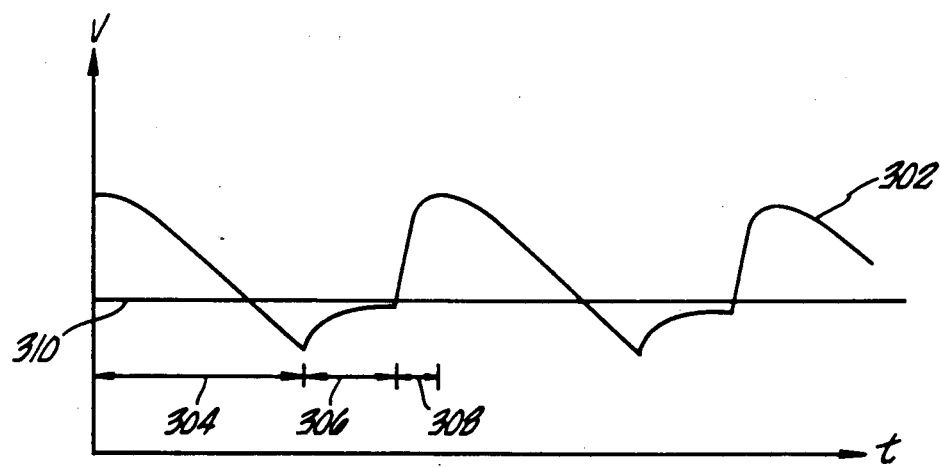
FIG. 3 is a timing diagram of a waveform produced by the circuit of FIG. 1 and input to transformer T 204.

FIG. 3 is a timing diagram of a waveform output by the circuit of FIG. 1 and input to transformer T 204. A waveform 302 representing measurement of voltage with respect to time, is output by the circuit of FIG. 1, and input to transformer T 204 having a first region 304, a second region 306, and a third region 308. Waveform 302 represents an AC powered signal; a zero voltage level 310 lies halfway between the positive and negative regions of waveform 302. It will be clear to one skilled in the art that a second waveform representing measurement of voltage at the output of T 204 will be similar in format to waveform 302. However, the voltage at the input of T 204 is a DC powered signal.

Figure 4:
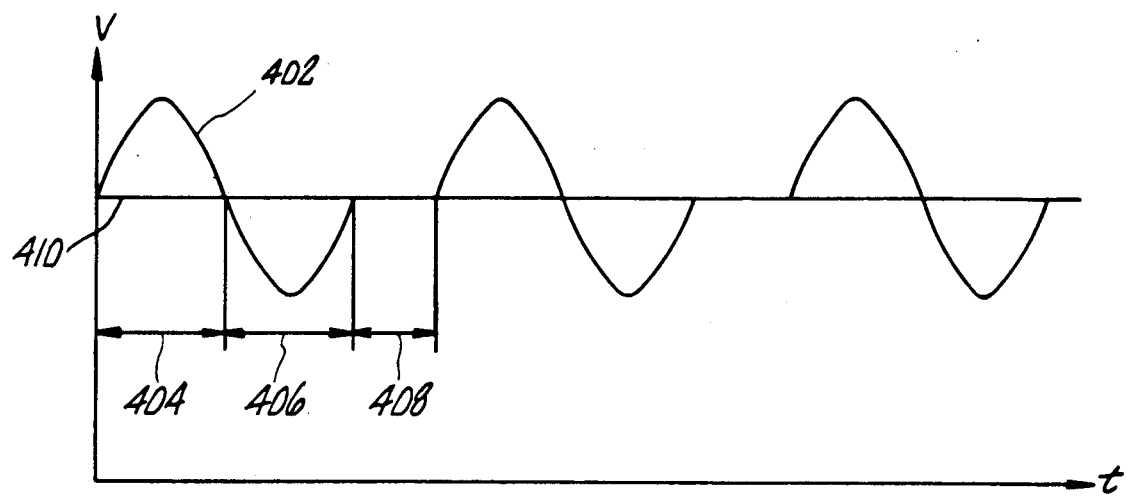
FIG. 4 is a timing diagram of a waveform produced by the circuit of FIG. 1 and output from transformer T 204.

FIG. 4 is a timing diagram of a waveform produced by the circuit of FIG. 1 and output from transformer T 204. The waveform 402 of FIG. 4 is the waveform which is input to the tube 246. FIG. 4 shows a positive region 404, a negative region 406, and a notch region 408 substantially located at a zero voltage 410. Note that the positive region 404 and the negative region 406 collectively form a single period of a sinusoidal wave.

The second region 306 of FIG. 3 is transformed by T 204 into the corresponding notch region 408 in FIG. 4. Note that waveform 402 is a non-continuous AC sinusoidal wave with the notch region 408 forming the discontinuity between successive periods of the sinusoid. As will become clear to one skilled in the art, after perusal of the circuit diagram of FIG. 1, and disclosure related thereto, it is during the notch region 408 that current and power are supplied to the base of Q 218. At other times, the circuit of FIG. 1 provides voltage stimulus to cause tube 246 to operate.

The combined duration of the positive region 404 and the negative region 406 exceeds the duration of the notch region 408. Thus, waveform 402, the voltage supplied to the tube 246, is "on" more than it is "off", and has a duty cycle of greater than 1-to-1. As used herein, "duty cycle" means the ratio of on-time to off-time in a periodic signal. On the other hand, current and power supplied to the base of Q 218, as shown by the duration of notch region 408, is "off⇌ more than it is "on", and has a duty cycle of less than 1-to-1.

In a preferred embodiment, the voltage duty cycle of waveform 402 may be between about 1.5-to-1 and 3-to-1, e.g., 2-to-1, and the waveform 402 may have a frequency of between 20 KHz and about 100 KHz.

Although the tube 246 draws power from the circuit only part of the time, it remains lit during the entire period of waveform 402 because the tube phosphor continues to emit light for a decay time which comprises about the entire time when the tube 246 is not directly powered. Adjustment of the duty cycle of waveform 402 causes adjustment of the power supplied to the tube 246 by the circuit (due in part to the change in time when the circuit is supplying power), as well as adjustment of the light emitted by the tube 246 (due in part to the change in time when the tube 246 is emitting light during its decay time). A duty cycle of about 2-to-1 is preferred for generating a maximum lumens/watt output by the combination of tube 246 and circuit.

Preferred component values for electrical components disclosed herein are listed:

| | |
|---|---|
| capacitor 108 | .01 microfarads, 630 volts DC |
| capacitor 110 | .01 microfarads, 630 volts DC |
| capacitor 112 | .01 microfarads, 630 volts DC |
| bridge 114 | 600 volts, 1 amp |
| resistor 118 | 1.5 ohms, .5 watts |
| capacitor 122 | 2.2 microfarads, 400 volts DC |
| inductor 124 | 215 millihenries |
| diode 126 | 600 volts, 1 amp |
| capacitor 130 | 35 microfarads, 450 volts DC |
| winding 202 | 2 turns |
| transformer 204 | 36/22 ferrite pot core |
| capacitor 206 | .22 microfarads, 400 volts DC |
| resistor 210 | 330 kilo-ohms, 5 watts |
| inductor 214 | 62 microhenries |
| resistor 216 | 180 ohms, .5 watts |
| transistor 218 | MJE 8500 series |
| winding 220 | 115 turns |
| capacitor 222 | .01 microfarads, 1500 volts DC |
| capacitor 228 | .47 microfarads, 100 volts DC |
| resistor 230 | 2 kilo-ohms, 5 watts |
| diode 232 | 600 volts, 1 amp |
| winding 234 | 14 turns |
| winding 238 | 185 turns |
| capacitor 242 | 1800 picofarads, 1500 volts DC |
| inductor 252 | 5 millihenries |

While a preferred embodiment is disclosed herein, many variations are possible which remain within the scope of the invention, and these variation would become clear to one skilled in the art after a perusal of the specification, drawings and claims herein.

I claim:

1. A circuit for operating at least one gas-filled tube, comprising
   power source means for providing power to said tube, said power source means comprising
      bridge rectifier means for receiving AC power from at least one AC power input lead, for transforming said AC power into DC power, and for supplying said DC power to at least one source node,
      limiter means for terminating supply of said DC power whenever said DC power exceeds a predetermined limiting condition, said limiter means comprising a low power resistor connected in series with at least one said AC power input lead, and
      filter means for removing predetermined signal components from said DC power;
   power transformer means, having primary and secondary coils for transmitting power to said tube, said primary coil operatively connected to said power source means, and said secondary coil operatively connected to said tube;
   feedback circuit means for generating a periodic signal and for modulating said power in accordance with said periodic signal, said feedback circuit means comprising
      oscillator circuit means for generating a periodic signal with a non-continuous sinusoidal shape and an on-to-off duty cycle of greater than one-to-one, said oscillator circuit means comprising winding means operative connected in a feedback configuration with said power transformer,
      startup resistor means for triggering oscillation of said oscillator circuit means,
      modulating transistor means for modulating said power in accordance with said periodic signal, and
      parallel combination of resistive means and inductive means connected between said modulating transistor means and said bias coil means;
   bias coil means for biasing said periodic signal to have a non-continuous sinusoidal shape with an on-to-off duty cycle of greater than one-to-one; and
   means for applying said periodic signal to said tube.

2. In a circuit for operating at least one gas-filled tube, a power transformer means for transmitting power to said tube, comprising
   a core;
   primary coil means, wound in a first direction around said core, for receiving power from a power source;
   secondary coil means, wound opposite from said first direction around said core, for transmitting said power to said tube;
   feedback coil means, wound in said first direction around said core, for generating a periodic AC signal and for modulating said power in accordance with said periodic AC signal; and
   bias coil means, wound opposite from said first direction around said core, for biasing said periodic signal to have a non-continuous sinusoidal shape with an on-to-off duty cycle of greater than one-to-one.

3. In a circuit for operating at least one gas-filled tube, a modulating transistor means for modulating said power in accordance with a periodic signal, comprising at least two transistors, wherein
   said transistors are disposed with their bases electrically connected, and with their emitters electrically connected; and
   each said transistor is disposed with its collector electrically connected to its emitter via a capacitive element, and with its emitter electrically connected to ground via an inductive element.

4. A circuit for operating at least one gas-filled tube, comprising
   power source means for providing power to said tube;

startup resistor means connected in series with said power source means;

first capacitive means connected in series with said startup resistor means;

power transformer means, having primary and secondary windings, for transmitting power to said tube, said secondary winding being wound in an opposite direction from said primary winding;

feedback winding means connected in series with said first capacitive means, connected in series with a first end of said primary winding, and wound in the same direction as said primary winding;

said power source means being connected between said feedback winding means and said primary winding;

second capacitive means connected in series between a second end of said primary winding and ground;

power transistor means,
  said power transistor means having a collector means connected between said second capacitive means and said second end of said primary winding,
  said power transistor means having an emitter connected to ground, and having a third capacitive means connected between said collector and said emitter, and
  said power transistor means having a base connected in series with a base node means via a parallel combination of a resistive means and an inductive means;

said base node means being connected between said startup resistor and said first capacitive means;

bias winding means connected to said power transformer, said bias winding being wound in an opposite direction from said primary winding;

said bias winding being connected in series with a first end of diode means; and said diode means having a second end connected in series with said base node means via resistor/capacitor filter means.

* * * * *